(12) United States Patent
Vlakhko

(10) Patent No.: US 11,415,796 B2
(45) Date of Patent: Aug. 16, 2022

(54) LOW DISTORTION LENS USING DOUBLE PLANE SYMMETRIC ELEMENT

(71) Applicant: DynaOptics Ltd, Singapore (SG)

(72) Inventor: Vadim Vlakhko, Moscow (RU)

(73) Assignee: DynaOptics Ltd, Singapore (SG)

( * ) Notice: Subject to any disclaimer, the term of this patent is extended or adjusted under 35 U.S.C. 154(b) by 121 days.

(21) Appl. No.: 15/958,804

(22) Filed: Apr. 20, 2018

(65) Prior Publication Data

US 2018/0239132 A1    Aug. 23, 2018

Related U.S. Application Data

(63) Continuation-in-part of application No. PCT/IB2016/001630, filed on Oct. 20, 2016.

(60) Provisional application No. 62/244,171, filed on Oct. 20, 2015.

(51) Int. Cl.
G02B 27/00 (2006.01)
G02B 3/00 (2006.01)
G02B 13/18 (2006.01)
G02B 7/04 (2021.01)
H04N 5/232 (2006.01)
G02B 13/06 (2006.01)

(52) U.S. Cl.
CPC ........ G02B 27/0037 (2013.01); G02B 3/0081 (2013.01); G02B 7/04 (2013.01); G02B 13/18 (2013.01); H04N 5/23238 (2013.01); G02B 13/06 (2013.01)

(58) Field of Classification Search
CPC .... G02B 27/0037; G02B 3/0081; G02B 7/04; G02B 13/18; G02B 13/06; H04N 5/23238

USPC ......................................................... 359/642
See application file for complete search history.

(56) References Cited

U.S. PATENT DOCUMENTS

| | | | |
|---|---|---|---|
| 5,912,764 A * | 6/1999 | Togino | A61B 1/00163 359/367 |
| 6,804,460 B1 | 10/2004 | Oshima | |
| 8,976,287 B1 | 3/2015 | Saint Clair | |
| 2004/0027684 A1 | 2/2004 | Nishioka et al. | |
| 2006/0187311 A1 | 8/2006 | Labaziewicz | |
| 2008/0088732 A1 | 4/2008 | Lin | |
| 2009/0268305 A1* | 10/2009 | Pretorius | G02B 13/08 359/668 |
| 2009/0322898 A1 | 12/2009 | Ohara et al. | |
| 2011/0261247 A1 | 10/2011 | Mathieu | |
| 2013/0107108 A1 | 5/2013 | Schauss | |
| 2015/0124330 A1* | 5/2015 | Ito | G02B 13/0095 359/696 |
| 2015/0146030 A1 | 5/2015 | Venkataraman | |
| 2015/0244942 A1 | 8/2015 | Shabtay | |
| 2015/0250583 A1 | 9/2015 | Rosen et al. | |
| 2015/0260965 A1 | 9/2015 | Inoue | |
| 2016/0018626 A1 | 1/2016 | Hou | |
| 2016/0131900 A1 | 5/2016 | Pretorius | |
| 2017/0094180 A1 | 3/2017 | Miller | |

(Continued)

*Primary Examiner* — Marin Pichler
*Assistant Examiner* — Mitchell T Oestreich
(74) *Attorney, Agent, or Firm* — James E. Eakin

(57) ABSTRACT

A low distortion lens suited for a wide variety of applications uses a double plane symmetry lens as part of a lens system to permit aberration correction to be optimized in the field of view of an associated sensor. Wide angle, Kepler telescopic and Galileo telescopic designs can be implemented. The design can be implemented using existing manufacturing techniques.

6 Claims, 13 Drawing Sheets

(56) References Cited

U.S. PATENT DOCUMENTS

2017/0094183 A1    3/2017   Miller
2018/0045964 A1    2/2018   Jones et al.
2018/0089903 A1    3/2018   Pang
2018/0239132 A1    8/2018   Vlakhko

* cited by examiner

| Lens | | Type | Material | Thickness / Air Gap | Focal Length | F-number |
|---|---|---|---|---|---|---|
| 500 | 1 | Aspherical | E48R (Plastic) | 3,96 mm/ 0,49 mm | 9,04 mm | 0,9 |
| 505 | 2 | Spherical | SF14 (Glass - Schott) | 1 mm/ 0,51 mm | -5,74 mm | 1,4 |
| 510 | 3 | Spherical | E48R (Plastic) | 3 mm/ 4,02 mm | 18,68 mm | 2,7 |
| 515 | 4 | Aspherical | OKP4HT (Plastic) | 2,44 mm / 4,19 mm | 8,84 mm | 1,8 |
| 520 | 5 | Aspherical | E48R (Plastic) | 1,66 mm / 1,43 mm | ~142,46 mm | 28,5 |
| 525 | 6 | Spherical | N-PK51(Glass - Schott) | 2,12 mm / 0,2 mm | 10,43 mm | 1,31 |
| 505 | 7 | Double Plane Symmetric | E48R (Plastic) | 2,95 mm / 3,01 mm | 9,49 mm | 1,2 |

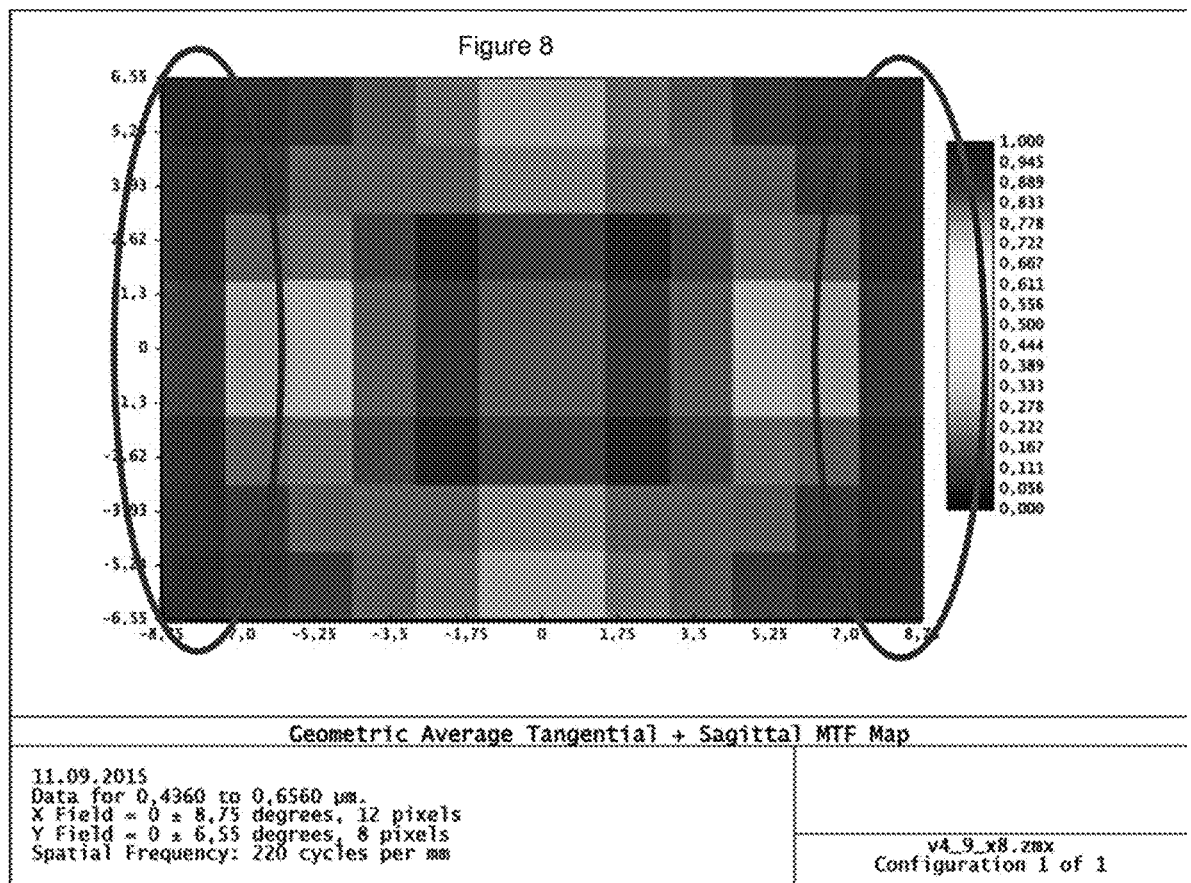
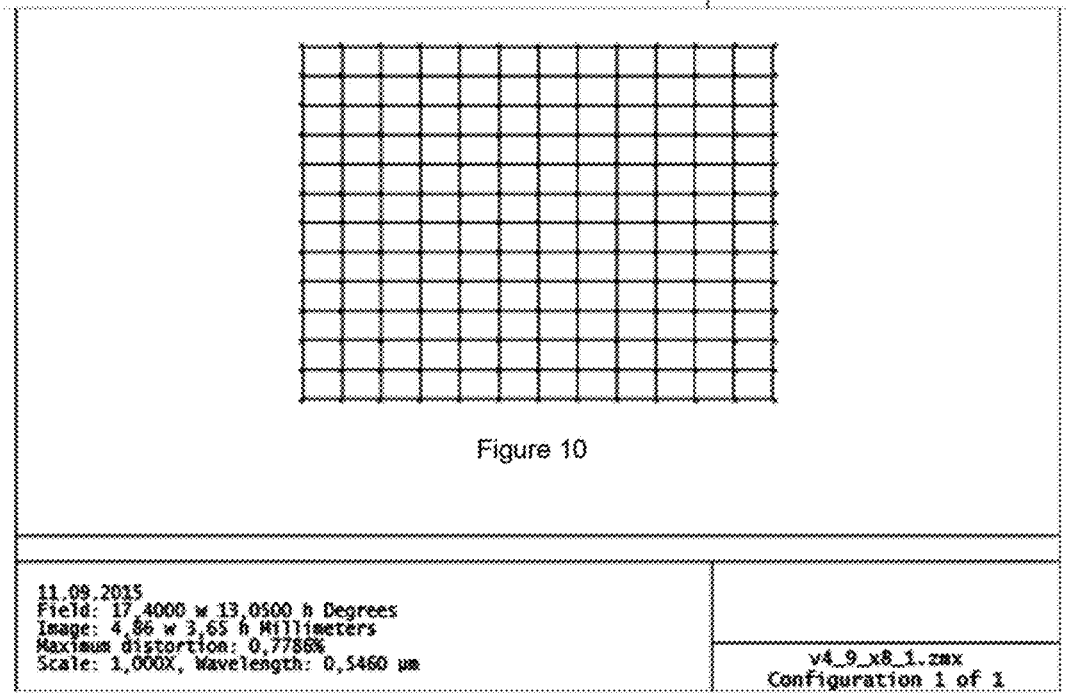

| Name | Value |
|---|---|
| Field of view, X * Y, deg | 21,9 * 16,5 |
| Magnification | 3x |
| Objective and Eyepiece F-number | 2,3 |
| Total Track, mm | 35 |
| Exit pupil position with respect to the last surface, mm | 1 mm |

| Lens | | Type | Material | Thickness / Air Gap | Focal Length | F-number |
|---|---|---|---|---|---|---|
| 1100 | 1 | Double Plane Symmetric | E48R (Plastic) | 13,7 mm/ 4,5 mm | 35,8 mm | 1,0 |
| 1105 | 2 | Aspherical | OKP4HT (Plastic) | 2 mm/ 0,2 mm | -16,1 mm | 0,7 |
| 1110 | 3 | Aspherical | E48R (Plastic) | 7,5 mm/ 2,3 mm | 17,6 mm | 1,1 |
| 1115 | 4 | Spherical | TAFD405 (Glass - Hoya) | 1,5 mm / 0,2 mm | -3 mm | 0,4 |
| 1120 | 5 | Aspherical | E48R (Plastic) | 2,06 mm / 1 mm | 4,1 mm | 1,0 |

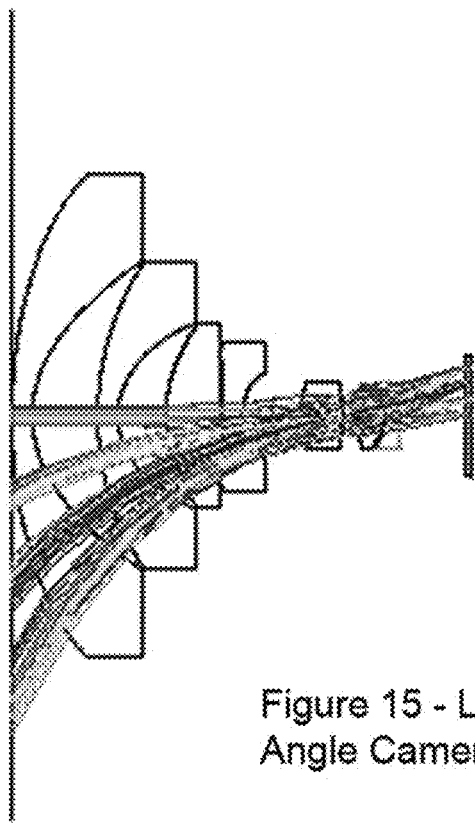
Figure 15 – Low Distortion Wide Angle Camera Lens
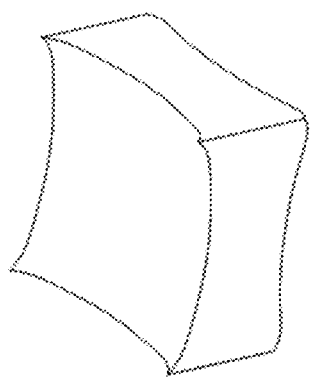
Figure 16 – Freeform lens Traditional constant effective focal length (EFL)

Rotational symmetric varying effective focal length (EFL)

Double-symmetry varying effective focal length (EFL)

Active area on image sensor

LOW DISTORTION LENS USING DOUBLE PLANE SYMMETRIC ELEMENT

RELATED APPLICATIONS

This application is a continuation-in-part of PCT Application PCT/IB2016/001630 having International Filing Date 20 Oct. 2016, which in turn claims the benefit of U.S. Patent Application 62/244,171, filed 20 Oct. 2015. The present application claims the benefit of priority of each of the foregoing applications, all of which are incorporated herein for all purposes.

FIELD OF THE INVENTION

This invention relates generally to low distortion optics, and more particularly relates to optics for matching the area of best optical performance to the area of the sensor.

BACKGROUND OF THE INVENTION

The general task of an optical design is to make a perfect conjugation between the object plane and the image plane, with no aberrations, distortions or other errors. Although many lenses are very good, such perfection is elusive.

Rotational symmetry is widely used in conventional lenses, with the field view and the aperture stop both being rotationally symmetric. With only rare exception, this results in the final design comprising rotationally symmetric elements. An example of such a conventional design is shown in FIG. 1.

However, most sensors—the photosensitive structures that record the image—are rectangular in shape. Thus, as shown in FIG. 2, the image space created by the lens of FIG. 1 creates a circular field of view, while the sensor that records the image is a rectangle. In an effort to optimize the mismatch, the diameter of the field of view of the lens system is matched to the diagonal size of the sensor.

Lens designs using only rotationally symmetric lenses attempt to achieve as good as possible image quality (IQ) inside the circular image space field of view. The objective includes minimizing optical aberrations such as spherical errors, coma, astigmatism, field curvature, distortion, axial and lateral aberration, color, and others. An inherent characteristic of rotationally symmetric designs is that the optical errors in the lenses are the same at all points equidistant from the center of the lens, even though points outside the area of the sensor are of no consequence to the stored image. Thus, optimal lens performance cannot be matched to the sensor's field of view, and the result is similar to that shown in FIG. 3.

Conventional optical systems introduce perspective aberrations for wide angle, low distortion lenses. The larger the field of view and the lower the distortion, the more pronounced such perspective aberrations become. As an example, it is common for objects at the edge of a wide angle image to appear stretched. This can be seen whether the undistorted wide angle image is the result of the optics, or is digitally dewarped from a distorted image. This perspective aberration is less apparent in images that have significant distortion, and becomes more apparent as distortion is reduced.

For lenses capturing fields of view larger than 180 deg, the image which actually reaches the typical rectangular sensor is a circle that does not fill up the whole rectangular sensor. This results in a lower resolution image than the sensor is capable of detecting. However, traditional rotationally symmetrical lenses typically are unable to create a non-circular image plane without introducing unacceptable image degradation due to aberrations.

As a result, there is a need for an optical design that matches optimal optical performance to the field of view of the sensor.

SUMMARY OF THE INVENTION

The present invention provides an optical design which overcomes the limitation of conventional rotationally symmetric designs. More particularly, the optical design of the present invention permits different aberration correction to be made along the X axis than along the Y axis. To achieve this improvement, an optical element having double plane symmetry is introduced into the optical system.

Depending upon the embodiment, a freeform optical element as contemplated by the present invention can have one optical surface with double plane symmetry, while the other surface is rotationally symmetrical. Alternatively, both surfaces can have double plane symmetry, or one surface may have another form of asymmetry. Multiple such freeform optical elements are also possible in the optical system. In the case of multiple elements having double plane symmetry, the orientation of the freeform elements in the assembly has to be aligned.

Through the use of such a freeform optical element, the image projected onto the sensor is better matched to the field of view of the sensor, resulting in enhanced resolution of the captured imaged and, effectively, higher resolution.

The lens design of the present invention is particularly well suited to wide angle lenses, but is also advantageous for normal and telephoto or zoom lenses. In addition, the lens design can be implemented as a fixed focal length lens attachment to an existing lens, such as might be integrated into a smart phone.

Perspective aberration can be corrected with these types of freeform optical elements. As noted above, perspective aberration results in an elongation, or stretching, of the object on the image plane of the sensor. The larger the field of view and the lower the optical distortion, the more apparent such perspective aberration becomes. Traditional optical system typically results in a constant effective focal length of the optical system throughout the field of view. The use of such freeform lens elements in accordance with the present invention implements a varying effective focal length of the optical system with respect to the field of the view. The changing effective focal length can be implemented for lenses that are rotationally symmetric, as discussed below in connection with FIG. 22. This changing effective focal length can, alternatively, be implemented with different rates of change of focal length along the X-axis and Y-axis. In an embodiment, this minimizes perspective aberration and can be accomplished while maintaining other optical performance such as image resolution.

For rotationally symmetric optical systems having a field of view larger than 180 degrees, the image plane on the sensor is a circle that does not completely fill the sensor. The freeform optical elements of the present invention allow a different effective focal length in the X-axis than in the Y-axis. This results in an image plane that is not a circle and maybe an oval which fills up more of the rectangle sensor. This increases the effective resolution of the image.

The elements of the lens, and the lens itself, can be fabricated using existing techniques and can be scaled in size for a variety of applications, including security cameras, smart phone attachments, dash cams, action cams, web cams, drone cameras, front facing selfie cameras, and so on.

These and other benefits of the design of the present invention can be appreciated from the following detailed description of the invention, taken together with the appended figures.

THE FIGURES

FIG. 1 [Prior Art] depicts the relationship between an object plane, a lens and an image plane.

FIGS. 8 and 10 [Prior art lens design] graphically illustrate optical image quality for a conventional, rotationally symmetric lens design, especially edge softness.

Figures 11A, 11B:
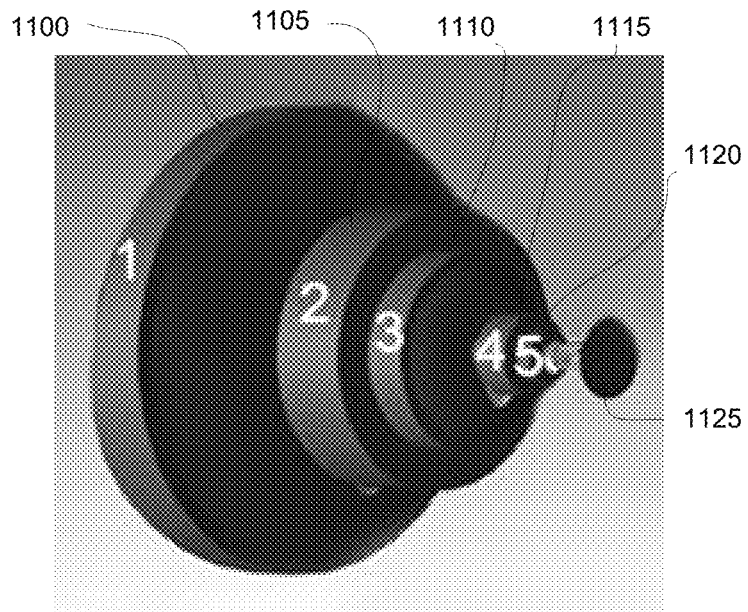

FIGS. 11A-11B show an embodiment of a five-element afocal Galileo-type telescopic lens design in accordance with the present invention.

Figure 12B:
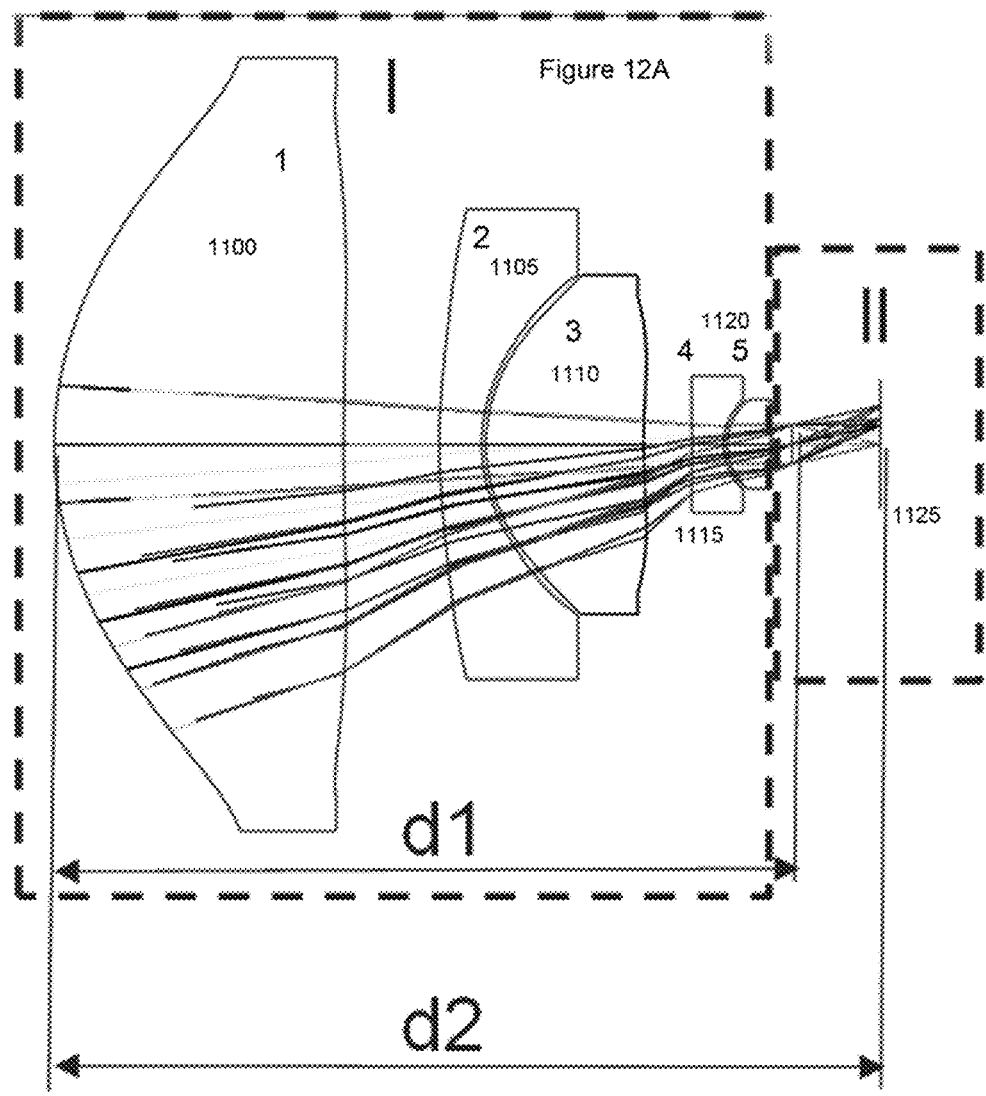

FIGS. 12A-12B show a ray path diagram of the lens design of FIGS. 11A-11B.

Figure 13:
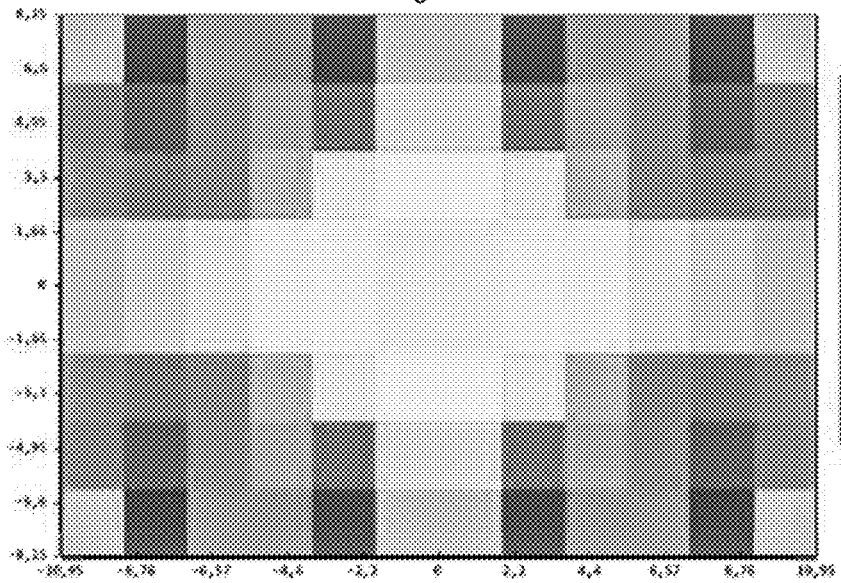
Figure 14:
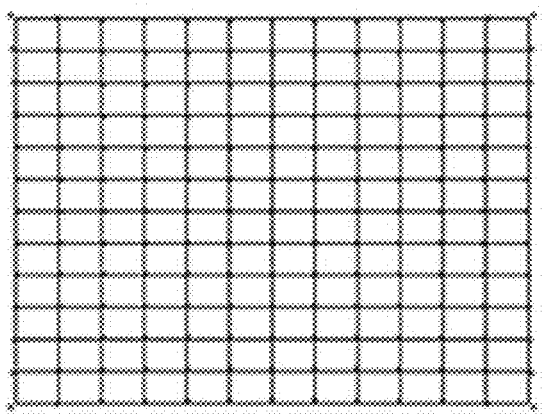

FIGS. 13 and 14 graphically illustrate image quality for the lens design of FIG. 11A.

FIG. 15 illustrates in ray path form the performance of a low distortion wide angle lens in accordance with the present invention.

FIG. 16 shows a double symmetry lens element in accordance with the present invention.

Figure 17:
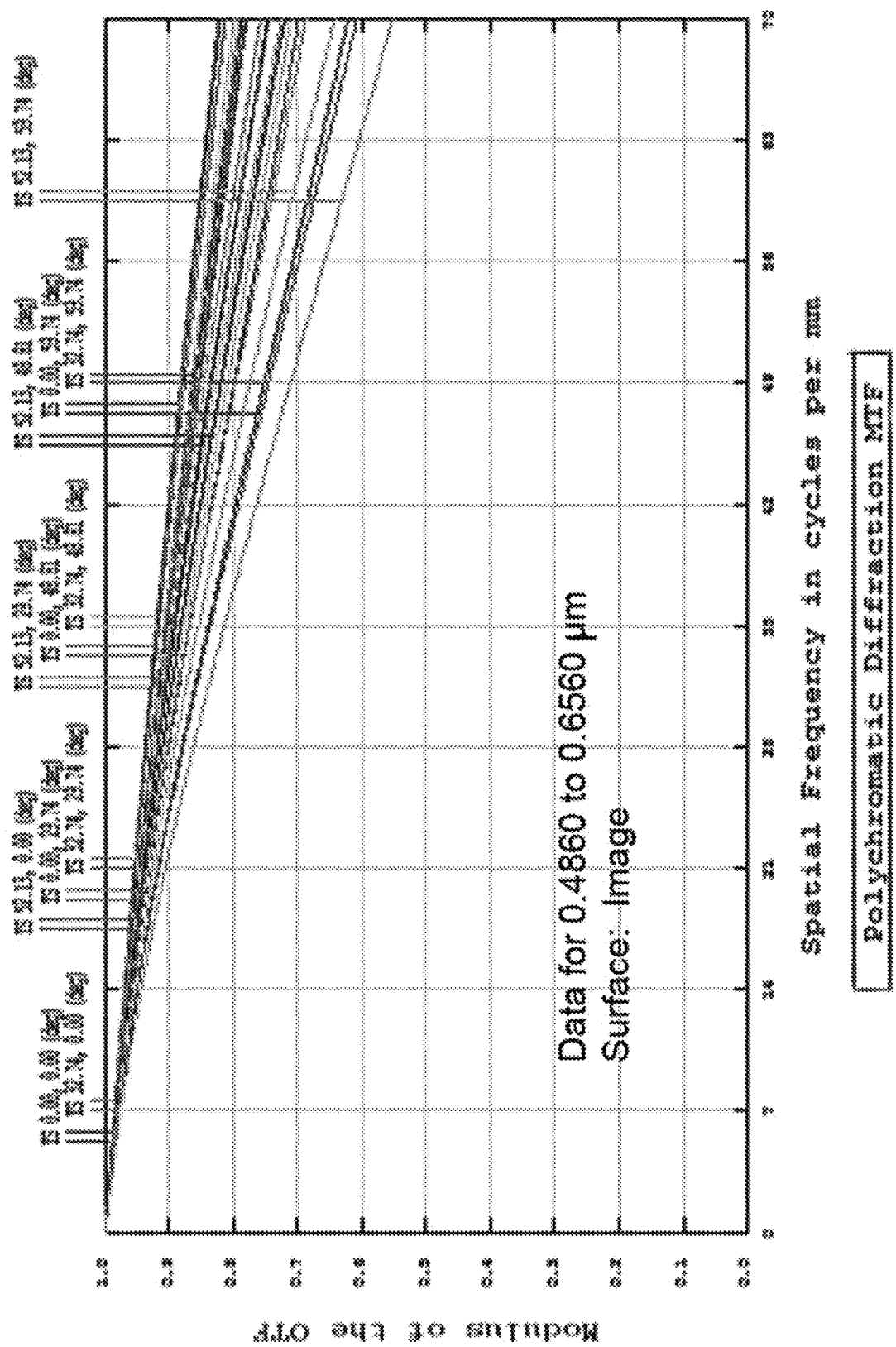
Figure 18:
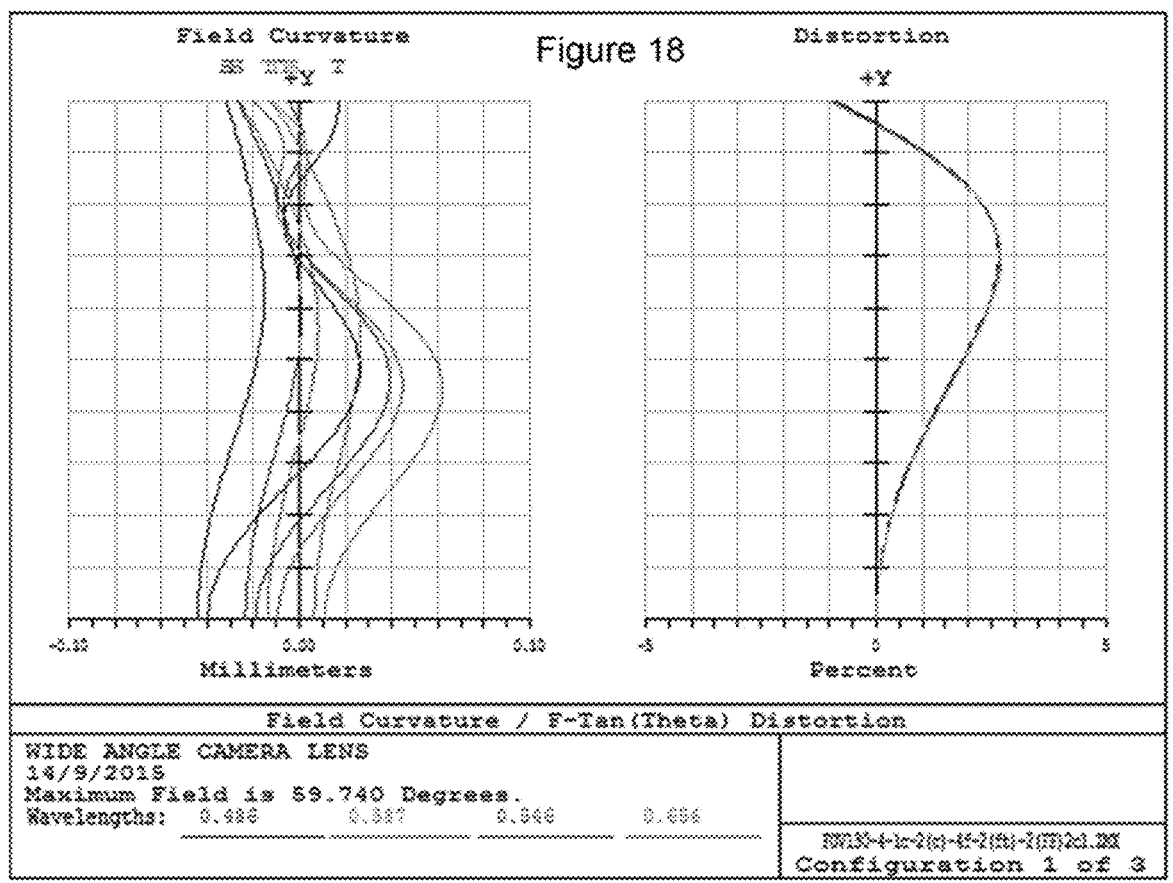
Figure 19:
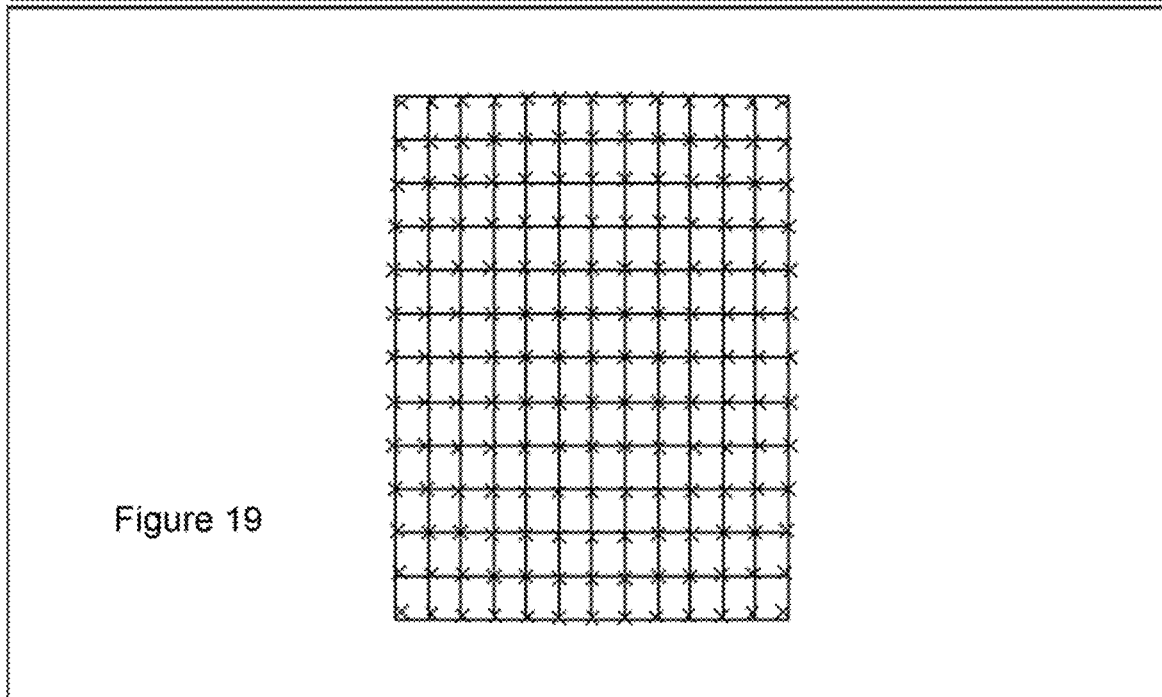

FIGS. 17-19 graphically illustrate the performance of a wide angle lens design in accordance with the present invention.

Figure 20:
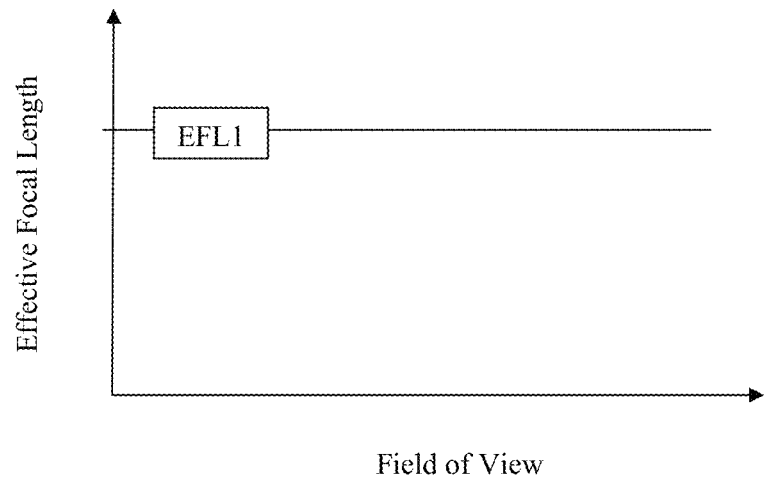
Figure 21:
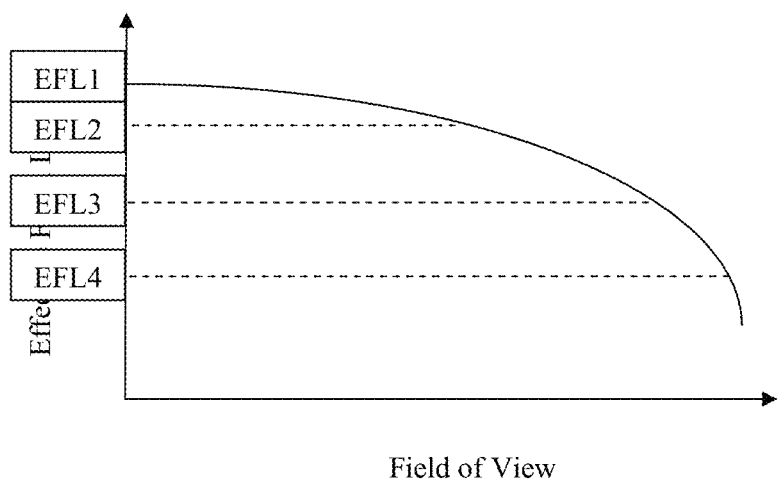
Figure 22:
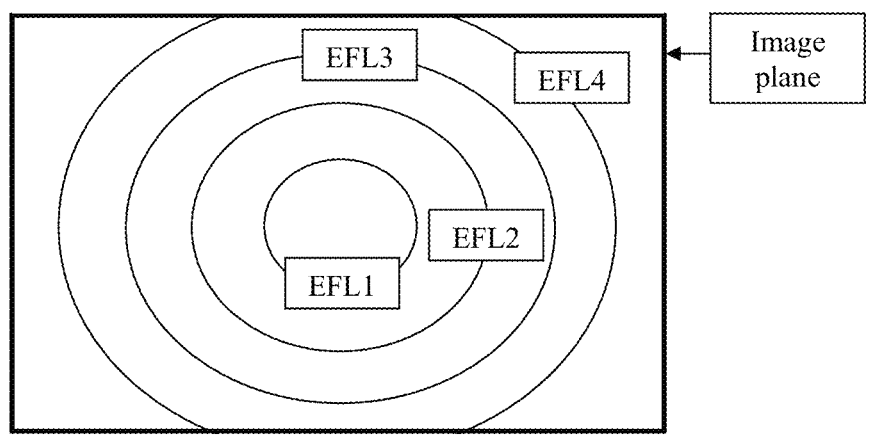
Figure 23:
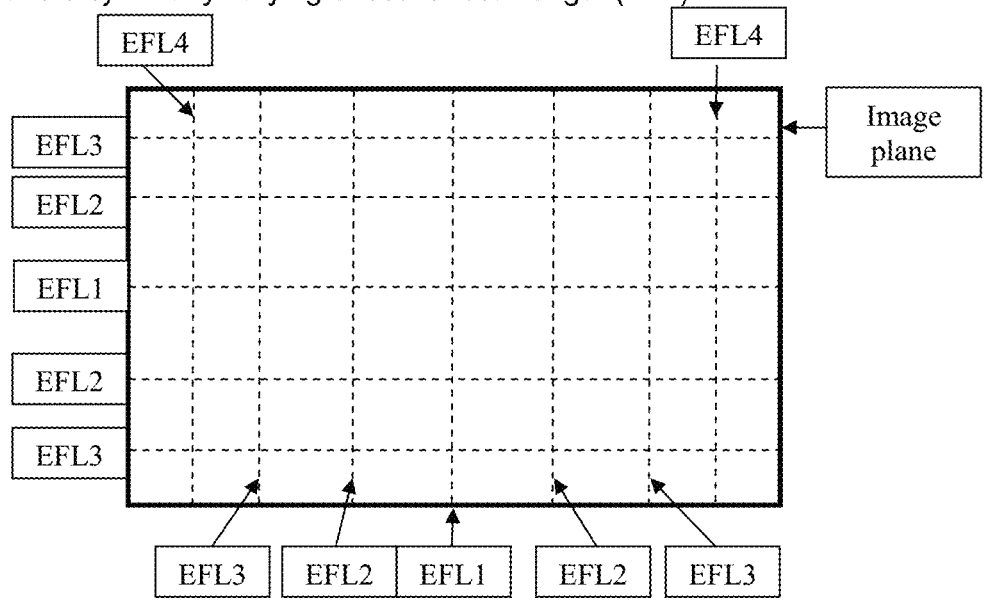
Figure 24:
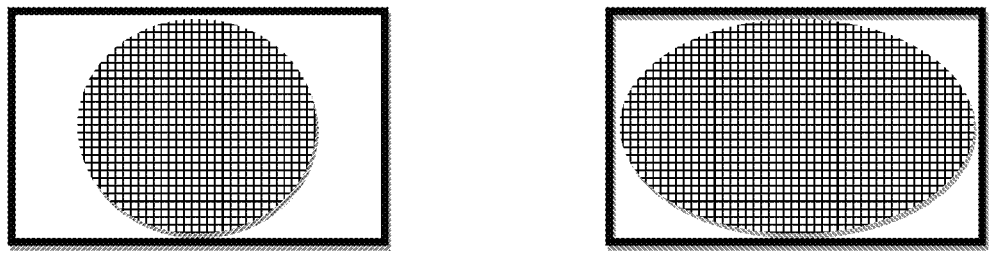

FIG. 20 illustrates the traditional optical systems having a constant effective focal length of the whole field of view of the sensor FIG. 21 illustrates an optical system where the effective focal length changes with the field on the sensor FIG. 22 illustrates how the effective focal length changes over the image sensor in a rotationally symmetric manner FIG. 23 illustrates the effective focal length changes differently along the X-axis and Y-axis on the image plane FIG. 24 illustrates a conventional image circle for a larger than 180 deg FOV lens (left) and a non-circular image circle for increased pixels

DETAILED DESCRIPTION OF THE INVENTION

Figure 4:
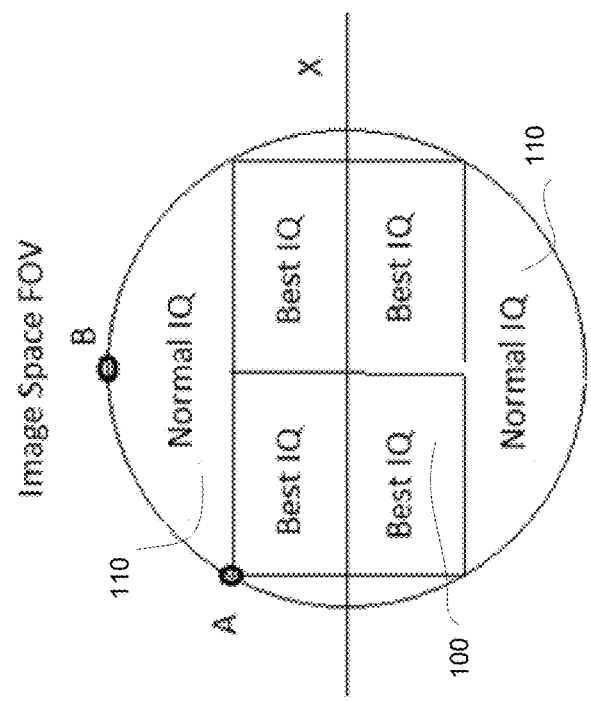
FIG. 4 illustrates the improved image quality at the sensor possible with the present invention.
Figure 3:
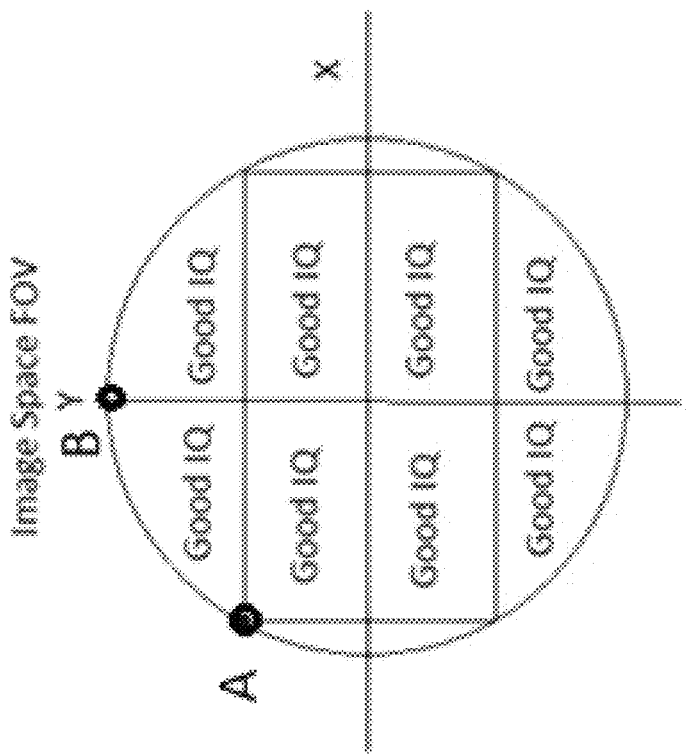
FIG. 3 illustrates the inability of rotationally symmetric lens designs to optimize image quality within the sensor area.

Referring first to FIG. 4, illustrated therein is a general description of the improvement in image quality that can be achieved by permitting different optimization at different distances from the axis of the lens. The area of the sensor, indicated at 100, is shown to have best image quality, while areas outside of the sensor, indicated at 110, are permitted a reduced quality since these areas are irrelevant to the image captured by the sensor.

Figure 2:
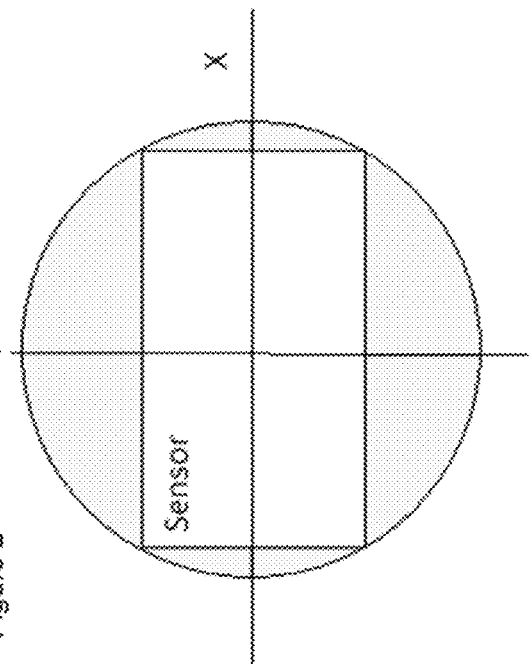
FIG. 2 illustrates the relationship between the field of view of a rotationally symmetric lens and the field of view of a rectangular sensor.
Figure 1:
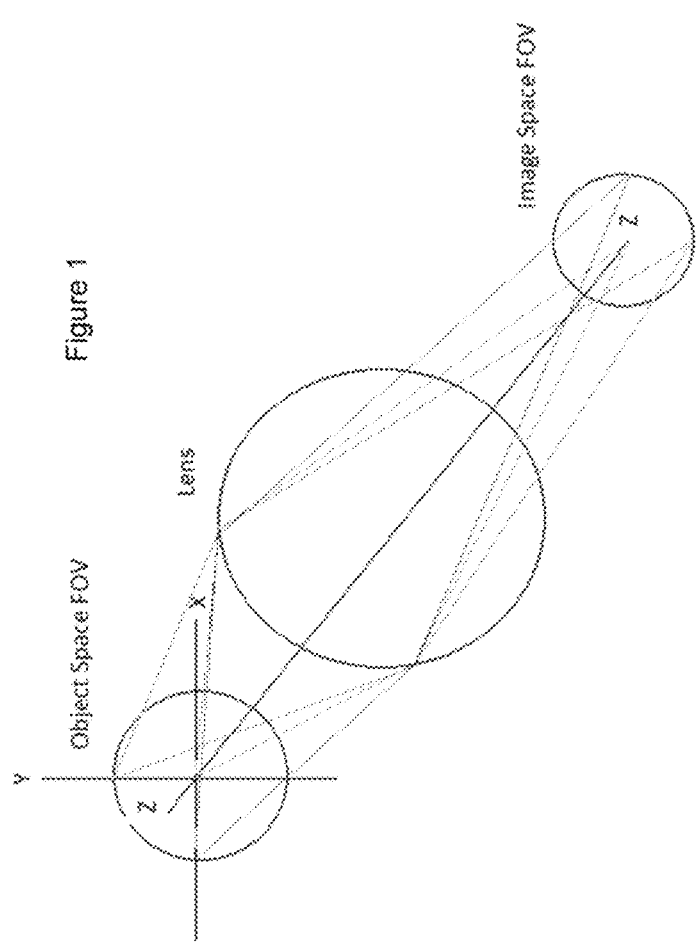
Figure 5:
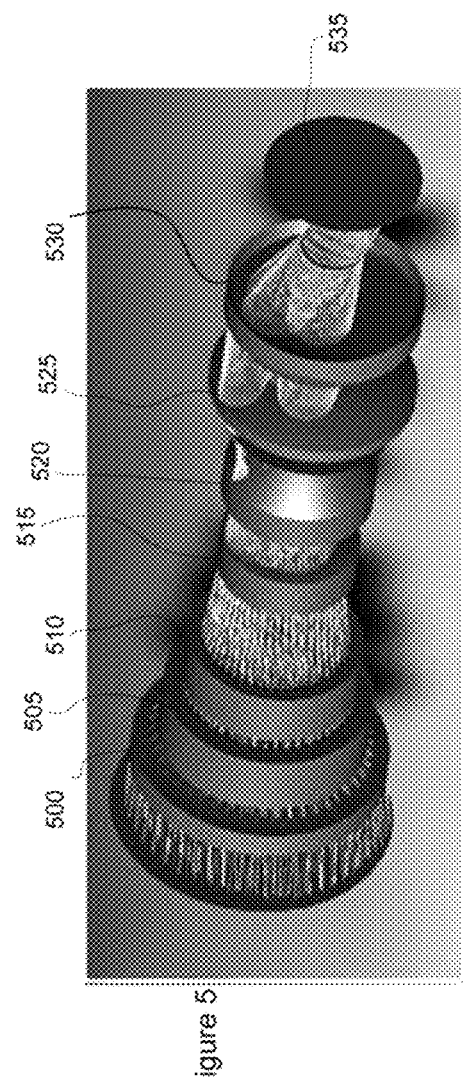
FIG. 5 illustrates an embodiment of a Kepler-type afocal telescopic lens design in accordance with the present invention.
Figures 6A, 6B:
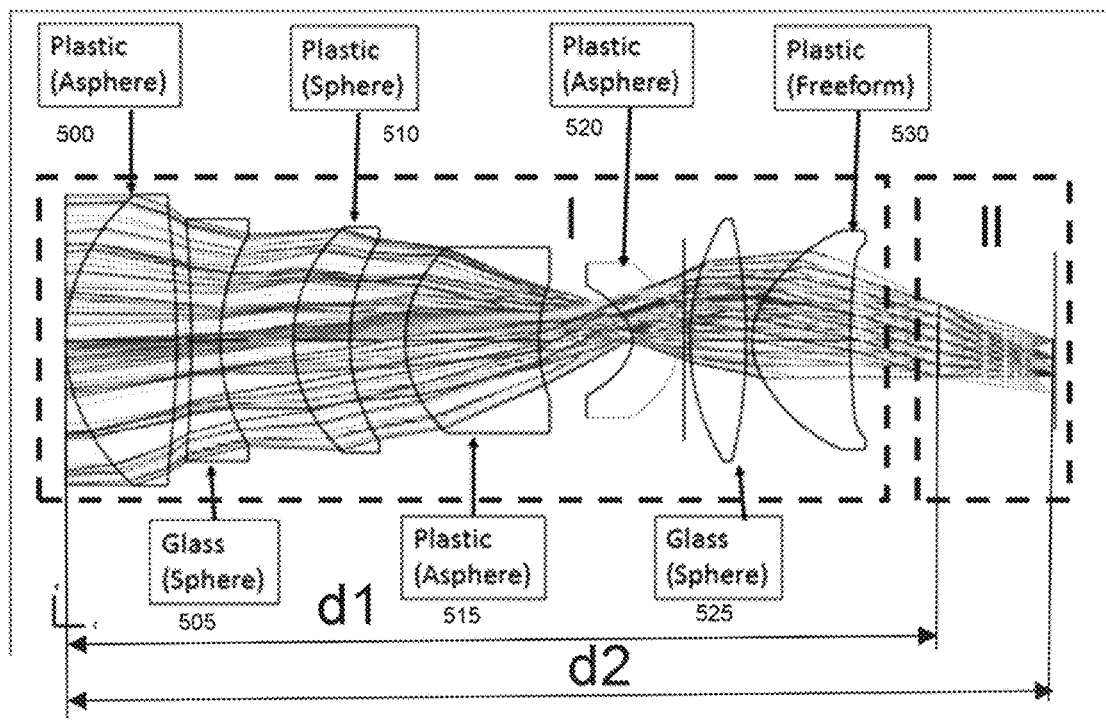
FIGS. 6A-6B illustrate in ray diagram and table form details of an embodiment of a lens design in accordance with the invention.
Figure 9:
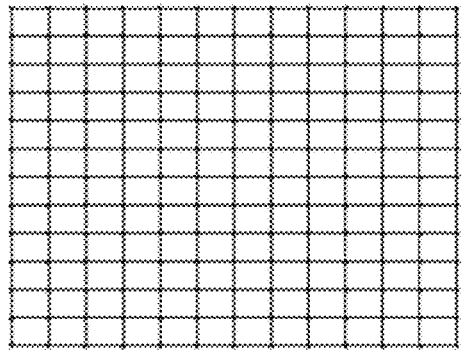

Next with reference to FIGS. 5 and 6A-6B, an embodiment of a lens system in accordance with the invention can be better appreciated. In the illustration of FIGS. 5 and 6A, a seven element lens system is shown in perspective and ray trace form, although not necessarily shown to scale. FIG. 6B presents in table form the details of the lens elements, while FIGS. 7 and 9 illustrate image quality and distortion information of the design as compared to the image quality and distortion information of a conventional rotationally symmetric lens shown in FIGS. 8 and 10.

Thus, as can be seen from FIGS. 6A and 6B, the first lens element, 500, can be seen to be aspheric and fabricated from a plastic such as E48R or equivalent. The second lens element, 505, is spherical and can fabricated from Schott SF14. The third element, 510, is also spherical but can be made from E48R plastic. Element 515 is, in the embodiment shown, aspherical and can be made from OKH4HT plastic. Element 520 is aspherical and can be made from E48R plastic, while element 525 is spherical in the embodiment shown and can be made from N-PK51 Schott glass. Finally, element 530 is a double plane symmetrical in shape and can be made from E48R plastic. Those skilled in the art will recognize that the particular materials are shown for exemplary purposes only, and numerous other materials provide substantially equivalent results with appropriate adjustments for the changed materials. The design of FIGS. 5, 6A-6B can be seen to be a Kepler type afocal telescopic system, comprising two major portions. Elements 500-515 comprise the objective portion, while lenses 520-530 comprise the eyepiece portion. For the example shown, both portions have positive optical power. The resulting lens has a nominal field of view of 17.4 degrees along the X axis, and 13.1 degrees along the Y axis, with a magnification of 4×, a total track of 31 mm, a distance from the last surface to the exit pupil of 3 mm, and an objective and eyepiece f-number of 1.67.

The lens design of FIG. 5 is particularly useful as an afocal telephoto lens of a fixed focal length, suitable for attaching to the front of a smart phone. This arrangement can be better appreciated from FIG. 6A, where the lens of FIG. 5 is indicated as portion I, and a smart phone camera is indicated as portion II. For purposes of clarity, the lens of the smart phone camera is presumed to be an ideal lens. For the example shown, the distance D1, the distance from the front surface of element 500 to the entrance to the phone's camera, can be ~30 mm, which the distance D2, total track, can be ~34 mm.

Figure 7:
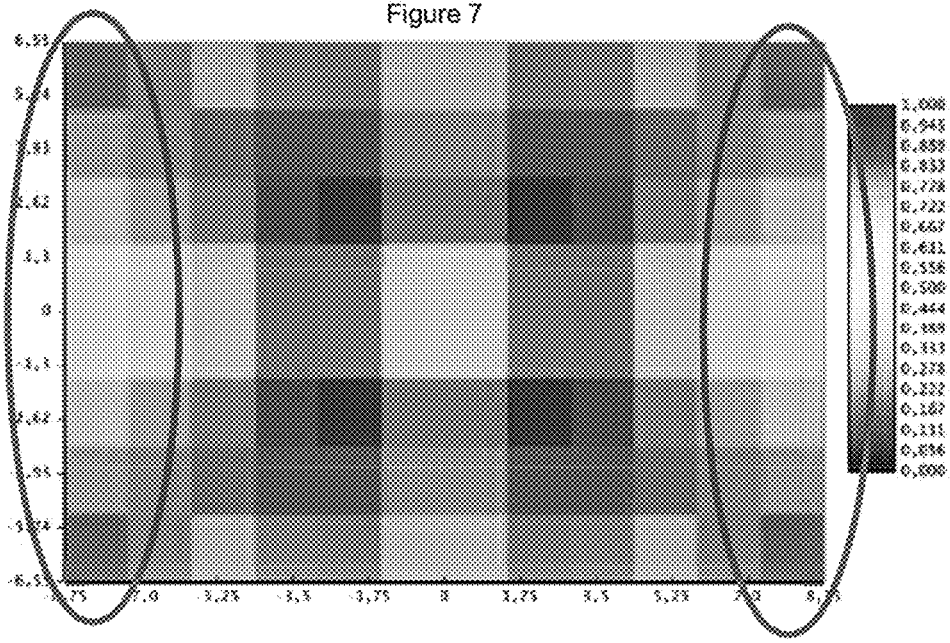
FIGS. 7 and 9 shows the improved optical image quality achievable with a lens design in accordance with the present invention.

The optical performance of the lens of FIG. 5 can be better appreciated from FIG. 7, which shows a geometric map of the lens' modulation transfer function (MTF) at 220 cyc/mm frequency, as compared to FIG. 8, which shows the geometric MTF of a rotationally symmetric lens system having the same technical specifications other than features of the present invention. In particular, the advantages of the present invention can be understood most easily by comparing the edges of the field view. Those skilled in the art will understand that green zones depict a higher MTF value, and thus the green zones at the edges of FIG. 7, compared to the blue zones at the edges of FIG. 8, demonstrates the performance improvement.

Similarly, FIGS. 9 and 10 are grid distortion maps for, respectively, the lens of FIG. 5 and a conventional rotationally symmetric lens. For the example shown, grid distortion for the lens of FIG. 9 is less that 0.63%, while the lens of FIG. 10 shows a distortion of less than 0.78%. While both values are acceptable in some instances, the benefits of the present invention offer significant value in more demanding applications.

A Galileo type afocal telescopic system in accordance with the present invention, together with its performance characteristics, are shown in FIGS. 11A-14. The lens system of FIG. 11, shown in cross-sectional ray path view in FIG. 12A, again comprises two parts, both with positive optical power. Elements 1100-1110 comprise the Objective, while elements 1115-1120 comprise the Eyepiece part, to project an image onto sensor 1125. Element 1100 is a double plane symmetric lens, while the other four elements are rotationally symmetric lenses. For the design shown, the field of view along the X axis is 21.9 degrees, and the field of view along the Y axis is 16.5 degrees. The magnification is 3×, with an f-number of 2.3. The total track is 35 mm, with a one mm distance from the last lens surface to the exit pupil. As before, those skilled in the art will recognize that these characteristics are exemplary and not limiting, and are provided simply to aid in understanding the benefits of the present invention as well as the ease of implementation.

Referring particularly to FIG. 12A, the relationship between the afocal lens of the present invention, indicated as portion I, and a camera with an existing lens such as a smart phone camera indicated as portion II, can be better appreciated. The table of FIG. 12B provides details regarding each element, similar to FIG. 6B. In the exemplary embodiment shown, the distance from the front surface of element 1 to the entrance to camera of portion II is ~35 mm, with a total track of ~39.2 mm. Performance information for the lens of FIG. 11 is shown in FIGS. 13-14, where FIG. 13 illustrates geometric MTF and FIG. 14 illustrates grid distortion, similar to FIGS. 7 and 9.

While the afocal lenses of FIG. 5 and FIG. 11 are telescopic, the present invention can also apply to wide angle lenses. Thus, shown in FIG. 15 is a cross-sectional ray plot of a wide angle lens system comprising six lens elements, where the sixth element is configured with double plane symmetry. The performance of such a lens system, again designed as an attachment to an existing camera such as a camera integrated into a smart phone, can be appreciate from the plot of FIG. 17, which shows polychromatic diffraction MTF, FIG. 18, which illustrates field curvature in both millimeters and percent, and FIG. 19 which is a plot of grid distortion.

Traditional optical systems have a constant effective focal length throughout the whole field of view of the sensor as in FIG. 20. FIG. 21 illustrates an optical system where the effective focal length changes depending on the location within the field of view on the sensor. The relation defining this change in effective focal length can be linear, a polynomial or an equation that varies only with the distance of the coordinate from the optical center of the image plane. In the example shown in FIG. 22, the effective focal length changes over a plurality of zones with the distance from the center on a lens having rotational symmetry. In some embodiments the image projected on the sensor is more oval than circular and thus the shape is defined by an axis or foci rather than the center of a circle.

Another way that the effective focal length can change to reduce the perspective aberration using double symmetry freeform lenses is to have the same or different rates of change parallel to the X-axis and Y-axis. In this manner, lines parallel to the X-axis or Y-axis in the object plane remains straight in the image plane when captured by the sensor as show in FIG. 23.

FIG. 24 illustrates a conventional image circle for a larger than 180 deg FOV lens. The resultant image does not fully utilize the whole sensor and thus obtain the full pixel count. A double symmetry freeform lens allows a non-circular image to be projected on the sensor to increase the number of usable pixels.

Those skilled in the art can, given the teachings herein, appreciate that a new and novel design for a low distortion lens has been disclosed, where an design having at least one element with double plane symmetry can be used in a Kepler type telescopic lens, a Galileo type telescopic lens, and a wide angle lens. While various embodiments of the invention have been disclosed in detail, it will be appreciated that the features of the exemplary embodiments discussed herein are not to be limiting, and that numerous alternatives and equivalents exist which do not depart from the scope of the invention. As such, the present invention is to be limited only by the appended claims.

I claim:

1. A lens system having a different effective focal length in an X axis than in a Y axis comprising:
    a plurality of lens elements, configured in at least two groups and to have an image plane,
    at least one of the lens elements having double plane symmetry in an optically active region wherein the effective focal length in the X axis is different than the effective focal length in the Y axis,
    wherein the respective X and Y effective focal lengths are configured to substantially match a ratio calculated from X and Y dimensions of a rectangular sensor positioned at the image plane, and
    wherein the lens element having double plane symmetry in an optically active region is the last lens element before light from an object plane is formed at the image plane.

2. The lens system of claim 1 wherein the lens element having double plane symmetry in an optically active region has an effective focal length along the X axis that changes at a different rate such that lines parallel to the X axis in the object plane remain substantially straight in the image plane.

3. The lens system of claim 1 wherein the lens element having double plane symmetry has an effective focal length along the Y axis that changes at a different rate such that lines parallel to the Y axis in the object plane remain substantially straight in the image plane.

4. The lens system of claim 1 wherein the total track is less than forty millimeters.

5. The lens system of claim 1 wherein the X and Y effective focal lengths are configured to substantially optimize the modulation transfer function of the lens system at the corners of the sensor.

6. The lens system of claim 1 wherein the lens system is a wide angle lens.

* * * * *